Jan. 17, 1961

G. B. THOMAS, JR 2,968,772

WAVE FILTER

Filed Nov. 14, 1958

INVENTOR
G. B. THOMAS, JR.
BY
Ralph T. Holcomb
ATTORNEY

United States Patent Office 2,968,772
Patented Jan. 17, 1961

2,968,772

WAVE FILTER

George B. Thomas, Jr., Summit, N.J., assignor to Bell Telephone Laboratories, Incorporated, New York, N.Y., a corporation of New York Filed Nov. 14, 1958, Ser. No. 773,873

3 Claims. (Cl. 333—73)

This invention relates to wave transmission networks and more particularly to wave filters using sections of coaxial transmission line and lumped capacitors.

The principal object of the invention is to increase the variety of wave-filter circuits suitable for operation at frequencies up to 1000 megacycles per second. A more specific object is to eliminate or reduce the parasitic inductances associated with multiple-unit capacitors used in such filters.

Wave filters intended for operation at frequencies up to 1000 megacycles often use only sections of transmission line to provide the component impedances. This construction limits the types of circuits and the width of transmission band. When lumped capacitors are used in an effort to overcome these limitations, the parasitic inductance associated with the capacitor leads causes deviations from the computed insertion loss characteristic.

The filter in accordance with the present invention minimizes these parasitic effects by employing a multiple-unit capacitor which requires practically no leads. The filter comprises a main section of coaxial transmission line and one or more stub sections branching therefrom, to provide the component inductances, and a multiple capacitor located in the main section at the branching point. The inner conductor of the main section is divided into two portions at the branching point, and the capacitor is inserted between them. The capacitor includes a transverse dielectric layer with two electrodes on one side and a single electrode on the opposite side. The electrodes on the same side are connected, respectively, to one portion of the inner conductor of the main section and the inner conductor of one of the stub sections. The single electrode is coupled to the other portion of the inner conductor of the main section. If additional capacitors are required, one or more electrodes, with interposed dielectric layers, may be added. If there is a second stub section, two electrodes may be provided on the outer side of the last dielectric layer and connections made from these electrodes, respectively, to the inner conductor of the second stub section and to the inner conductor of the main section.

In the embodiment presented herein, the filter is a two-section, high-pass, ladder-type structure, with a transmission band extending from 290 to more than 1000 megacycles. Two stub sections and a multiple capacitor furnishing five capacitances are required. However, the invention is applicable also to other types of filters.

The nature of the invention and its various objects, features, and advantages will appear more fully in the following detailed description of a typical embodiment illustrated in the accompanying drawing, of which Fig. 1 is a top view of a two-section wave filter in accordance with the invention, with the top half of the block removed;

Figures 1, 2, 3:
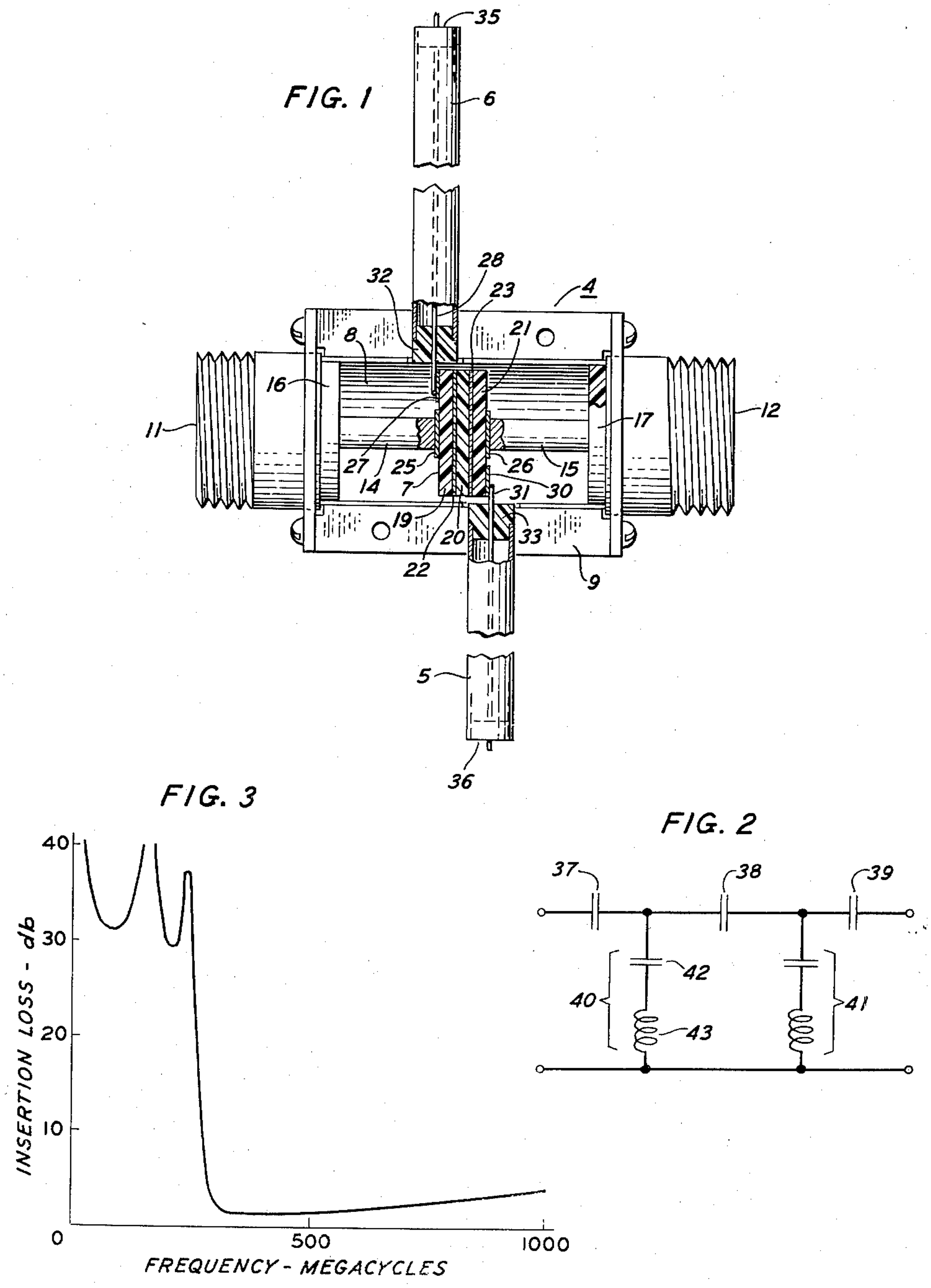
Fig. 2 is a schematic circuit of the filter.
Fig. 3 is a measured insertion loss-frequency characteristic obtainable with the filter.

The filter comprises a main section of coaxial transmission line 4, two coaxial stub sections 5 and 6 branching therefrom, and a multiple capacitor 7 located within the main section 4 at the branching point. The outer conductor of the section 4 is made from a rectangular block of metal with a central bore 8 therein. The block is cut in half longitudinally to facilitate assembly. In Fig. 1, the top half of the block has been removed so that only the bottom half 9 is seen. The flanged coaxial jacks 11 and 12 are provided at the ends of the section 4 for connecting the signal source and the load to the filter.

The cylindrical inner conductor of the section 4 is made in two portions 14 and 15 which are spaced apart a sufficient distance to permit the insertion of the capacitor 7. At their outer ends, these portions 14 and 15 are soldered to the ends of the inner conductors of the jacks 11 and 12, respectively. The insulating washers 16 and 17 support the inner conductors and keep them centered in the bore 8.

The capacitor 7 comprises three dielectric layers 19, 20, and 21, in the form of disks with a diameter somewhat less than that of the bore 8, and interposed electrodes 22 and 23 of the same diameter. The outer sides of the dielectric disks 19 and 21 have centrally positioned circular electrodes 25 and 26, respectively, to which the inner ends of the inner conductor portions 14 and 15, respectively, are soldered. The outer side of the disk 19 has a second electrode 27 to which the end of the inner conductor 28 of the stub line 6 is soldered. A similarly placed electrode 30 on the disk 21 is connected to the inner conductor 31 of the stub line 5. The dielectric layers 19, 20, and 21 may, for example, be made of titanium dioxide or of mica. The electrodes may be platings of silver applied to the dielectric material. The electrode 27 or 30 may, if necessary, completely encircle the central electrode 25 or 26. The dielectric constants and thicknesses of the dielectric layers and the areas of the electrodes are chosen to provide the desired capacitances. The conductors 28 and 31 are supported at their inner ends by the insulating washers 32 and 33, respectively, and are shorted at their outer ends by the metallic plugs 35 and 36, respectively.

The schematic circuit of the filter is shown in Fig. 2. The circuit comprises three series capacitors 37, 38, and 39 and two series-resonant shunt branches 40 and 41 forming a two-section, ladder-type filter. The capacitor 37 is constituted by the electrodes 22 and 25 and the interposed dielectric layer 19. The capacitor 42 in the branch 40 is formed by the electrodes 22 and 27 and the dielectric 19, and the capacitor 38 by the electrodes 22 and 23 and the dielectric 20. It is thus seen that no lead wires are required to interconnect the star-connected capacitors 37, 38, and 42 because they all have a common electrode 22. Furthermore, since the capacitor 42 is located at the point where the stub 6 branches from the main section 4, only a very short lead is required to connect this capacitor to the inductor 43 in the branch 40. With the capacitor leads practically eliminated, the parasitic inductances ordinarily associated with such leads at the contemplated high operating frequencies are also substantially eliminated and thus the operation of the filter is greatly improved.

A measured insertion loss-frequency characteristic obtainable with the filter of Fig. 1 is shown in Fig. 3. The filter is of the high-pass type, with a loss of more than 29 decibels from zero to 240 megacycles, and less than four decibels from 290 to 1000 megacycles.

The characteristic shown was obtained with a filter in which the stub sections 5 and 6 have lengths of 1⁹⁄₁₆ inches and 3¹³⁄₁₆ inches, respectively, the outer conductor is brass tubing with an inside diameter of a quarter inch, and the inner conductor is 22-gauge copper wire. The loss in the transmission band could be reduced somewhat by using shorter stub sections with a smaller inner conductor.

It is to be understood that the above-described arrangement is only illustrative of the application of the principles of the invention. Numerous other arrangements may be devised by those skilled in the art without departing from the spirit and scope of the invention. For example, the filter shown in Fig. 1 may be simplified into a one-section or a half-section structure by omitting some of the parts. To obtain a one-section filter, the stub 6, the electrodes 25 and 27, and the dielectric 19 are left out, and the inner conductor portion 14 is connected to the electrode 22. For a half-section filter, the electrode 22 and the dielectric 20 are omitted also, and the inner conductor portion 14 is connected to the electrode 23.

What is claimed is:

1. A wave filter comprising a main section of coaxial transmission line, a stub section of coaxial transmission line branching therefrom with no direct connection between the inner conductors of the stub section and the main section, and a multiple capacitor, the inner conductor of the main section being divided into two portions at the branching point, and the capacitor being located between the two portions and comprising a dielectric layer, an electrode on one side thereof connected to one of the portions, an electrode on the opposite side thereof coupled to the other portion, and an additional electrode on one side thereof connected to the inner conductor of the stub section, whereby the capacitor provides a capacitance in series with the main section and a capacitance coupling the inner conductor of the stub section to the inner conductor of the main section.

2. A wave filter comprising a main section of coaxial transmission line having an inner conductor in two portions separated by a gap, a stub section of coaxial transmission line branching from the main section at the gap with no direct connection between the inner conductors of the stub section and the main section, and a multiple capacitor located in the gap, the capacitor including two dielectric layers, an interposed electrode, an electrode on the outer side of one of the layers coupled to one of the portions, and two electrodes on the outer side of the other layer connected, respectively, to the other portion and to the inner conductor of the stub section, whereby the capacitor provides three star-connected capacitances, two of the capacitances being in series with the main section and the third capacitance coupling the inner conductor of the stub section to the inner conductor of the main section.

3. A wave filter comprising a main section of coaxial transmission line having an inner conductor in two portions with a gap between, a multiple capacitor positioned within the gap, and two stub sections of coaxial tranmission line branching from the main section near the capacitor with no direct connection between the inner conductor of the main section and the inner conductor of either stub section, the capacitor including three dielectric layers with interposed electrodes, electrodes on the outer sides of the end layers connected, respectively, to the portions, and additional electrodes on the outer sides of the end layers connected, respectively, to the inner conductors of the stub sections, whereby the capacitor provides three capacitances in series with the main section and individual capacitances coupling the inner conductor of the main section to the respective inner conductors of the stub sections.

References Cited in the file of this patent

UNITED STATES PATENTS

| | | |
|---|---|---|
| 2,149,356 | Mason | Mar. 7, 1939 |
| 2,624,801 | Richards | Jan. 6, 1953 |
| 2,677,809 | Bradburd et al. | May 4, 1954 |